United States Patent [19]
Laack et al.

[11] 3,876,556
[45] Apr. 8, 1975

[54] EXHAUST CATALYST CARRIER OF ALUMINUM OXIDE HONEYCOMB STRUCTURE HAVING AN OUTER SHELL OF ALUMINUM PHOSPHATE

[75] Inventors: Erich Laack; Ulf Dworak, both of Plochingen; Gerhard Thamarus, Weiler/Fils, all of Germany

[73] Assignee: Feldmuhle Anlagen- und Produktionsgesellschaft mit beschrankter Haftung, Duesseldorf-Oberkassel, Germany

[22] Filed: Dec. 26, 1973

[21] Appl. No.: 427,152

[30] Foreign Application Priority Data
Dec. 27, 1972 Germany............................ 2263554

[52] U.S. Cl............... 252/437; 252/477 R; 117/98; 117/169 R
[51] Int. Cl. ....................... B01j 11/06; B01j 11/82
[58] Field of Search ....... 252/477 R, 437; 23/288 F, 23/288 FC; 117/98, 169 R; 106/40 R

[56] References Cited
UNITED STATES PATENTS

| | | | |
|---|---|---|---|
| 3,248,251 | 4/1966 | Allen | 117/169 R |
| 3,300,331 | 1/1967 | Collins | 117/169 R |
| 3,502,596 | 3/1970 | Sowards | 252/477 R |
| 3,692,497 | 9/1972 | Keith et al. | 23/288 F |
| 3,798,006 | 3/1974 | Balluff | 23/288 F |
| 3,799,796 | 3/1974 | Hunter | 252/477 R |
| 3,817,781 | 6/1974 | Church et al. | 117/98 X |

Primary Examiner—Winston A. Douglas
Assistant Examiner—W. J. Shine
Attorney, Agent, or Firm—Hans Berman; Kurt Kelman

[57] ABSTRACT

The radial and axial compressive strength of an approximately cylindrical catalyst carrier, for automotive exhaust gases which is a honeycomb structure of thin aluminum oxide walls bounding axial conduits, is greatly enhanced by an outer shell of cured aluminum phosphate cement even if the latter is only one millimeter thick. The resistance of the carrier to thermal shock is improved if the wall of the shell spacedly envelops the outer axial face of the honeycomb core, and the annular gap is at least partly occupied by ceramic fibers which provide thermal insulation.

9 Claims, 3 Drawing Figures

EXHAUST CATALYST CARRIER OF ALUMINUM OXIDE HONEYCOMB STRUCTURE HAVING AN OUTER SHELL OF ALUMINUM PHOSPHATE

This invention relates to ceramic carriers for automotive exhaust catalysts, and particularly to an improvement in a catalyst carrier disclosed and claimed in the commonly owned application of Langeheine et al., Ser. No. 322,918, filed on Jan. 12, 1973.

In the earlier application there was disclosed a catalyst carrier which is a honeycomb structure of thin aluminum oxide walls, partly of corrugated configuration and joined to each other in modes along the ridges of the corrugations so as to bound continuous conduits elongated in a common direction.

While the catalyst carriers of the earlier invention have good thermal shock resistance due to the thinness of their honeycomb walls, and surprising strength considering the small wall thickness, it has been found that they cannot resist relatively high, localized, compressive stresses, such as those exerted by a mounting screw directly acting on the outermost aluminum oxide wall. Damage to the carriers was also observed when the carriers were mounted loosely in an automobile frame and repeatedly collided with metallic elements during travel of the vehicle over rough roads.

The wall thickness of the earlier catalyst carriers cannot be increased significantly without losing some of their most important advantages, such as small weight per unit of available surface area, and good resistance to sudden changes of temperature. It was also found impractical to encase the honeycomb structure in an outer shell of metal or of heavier aluminum oxide. The difference in the coefficients of thermal expansion of aluminum oxide and of any metal is too great to permit an adequate fit. A heavy outer aluminum oxide shell, while more resistant to some mechanical stresses, still is too brittle to withstand repeated impact.

It has now been found that cured cements of aluminum oxide and phosphoric acid which consist of a mixture of aluminum phosphates have coefficients of thermal expansion closely similar to that of sintered aluminum oxide, are much less brittle than aluminum oxide, and have excellent axial and radial compressive strength when in tubular form. Moreover, they fully resist the normal operating temperatures of an exhaust gas catalyst and the temperature changes inherent in the normal operation of the catalyst.

The radial and axial compressive strength of a honeycomb catalyst carrier of the earlier invention is readily increased by more than 100 percent, and radial crushing strength may be increased better than tenfold when the honeycomb structure is enveloped in an outer shell of cured alumina-phosphoric acid cement having a thickness not greater than 2 mm and as small as 1 mm, such a cement being referred to hereafter as "aluminum phosphate cement."

These cements are unique among ceramic cements in that they cure without significant shrinkage. Commonly employed, other ceramic cements shrink during curing at rates of at least 0.25 percent to 0.50 percent. If such conventional cements are applied directly to an otherwise finished honeycomb structure of thin aluminum oxide walls, and shrinkage cracks form in the cement during curing, the adhesion between the cement and the aluminum oxide in the honeycomb walls is sufficient that the stress concentrations generated at the cracks are transmitted to the fired honeycomb wall and cause failure in the latter. Such failures are safely avoided with cements initially consisting of aluminum oxide, phosphoric acid, and enough water to make a workable paste. It has been found that the volumetric shrinkage in the curing aluminum phosphate cement causes the formation of pores or closed internal voids in the cement structure which do not tend to grow and do not cause externally visible failure. These pores or voids have diameters of the order of magnitude of 0.1 mm and are sufficiently spaced from each other not to have a significant effect on the strength of the cement shell.

Aluminum phosphate cements, that is, cements initially containing alumina, phosphoric acid and water, or initially containing water soluble aluminum phosphates, cure when their water content is reduced until a constant weight is reached. The available water is preferably volatilized at temperatures above 200°. Heating to more than 500°C does not produce any advantage, but drying at temperatures as high as 1,000°C has been found to be entirely feasible.

The formation of internal voids is enhanced by preparing the cement pas⁀ ⁀m crushed aluminum oxide particles of which 30 percent to 70 percent by weight pass through a standard 28 mesh screen while being retained on a 48 mesh screen. The size of the fines which constitute the balance of the alumina powder is not of particular importance.

Materials which volatilize during curing at elevated temperature may be beneficial in promoting porosity and/or in giving the applied paste sufficient green strength to avoid displacement under the force of gravity, and some organic materials suitable for this purpose may also serve as lubricants which facilitate working of the paste. Such ingredients, which may be used in amounts up to 20 percent of the solids in the initial paste include ammonium bicarbonate, saw dust, cellulose fibers, plastic powders or beads, and particularly amide waxes, such as Hoechst Wax C (distearoyl ethylenediamine), glycerol and other polyols in amounts of 1 percent to 10 percent are effective lubricants.

It has further been found that the mechanical strength of the catalyst carriers of this invention is not impaired while resistance to severe thermal shock is improved when the outer shell of cured aluminum phosphate cement is not backed directly by the outermost aluminum oxide wall, but separated from most of the outer face of the honeycomb core by a gap which may be filled with air and is preferably filled with thermal insulation occupying at least a part but preferably not more than 50 percent of the gap. Such insulation may consist of ceramic fibers (glass, asbestos, mullite, kaolin), and the modified carrier is prepared by wrapping a core of cylindrical shape or otherwise arcuate cross section in paper containing ceramic fibers, and applying the aluminum phosphate cement paste to the wrapped core. During curing of the cement at elevated temperature, the cellulose fibers constituting much of the wrapper are volatilized, and the residual ceramic fibers form a loose layer of insulating material partly embedded in the cured aluminum phosphate cement.

It is preferred to wrap only the axially central portion of the honeycomb core in the partly ceramic paper, and to keep the axial ends of the outer core face exposed. The paste layer applied over the wrapping thus makes direct contact with the outer honeycomb face at the two axial ends of the core, and the cured cement axially seals the gap containing the ceramic fibers.

Other features and many of the attendant advantages of this invention will readily be appreciated as the same becomes better understood from the following detailed description of preferred embodiments of the invention when considered in connection with the appended drawing in which.

Figure 1:
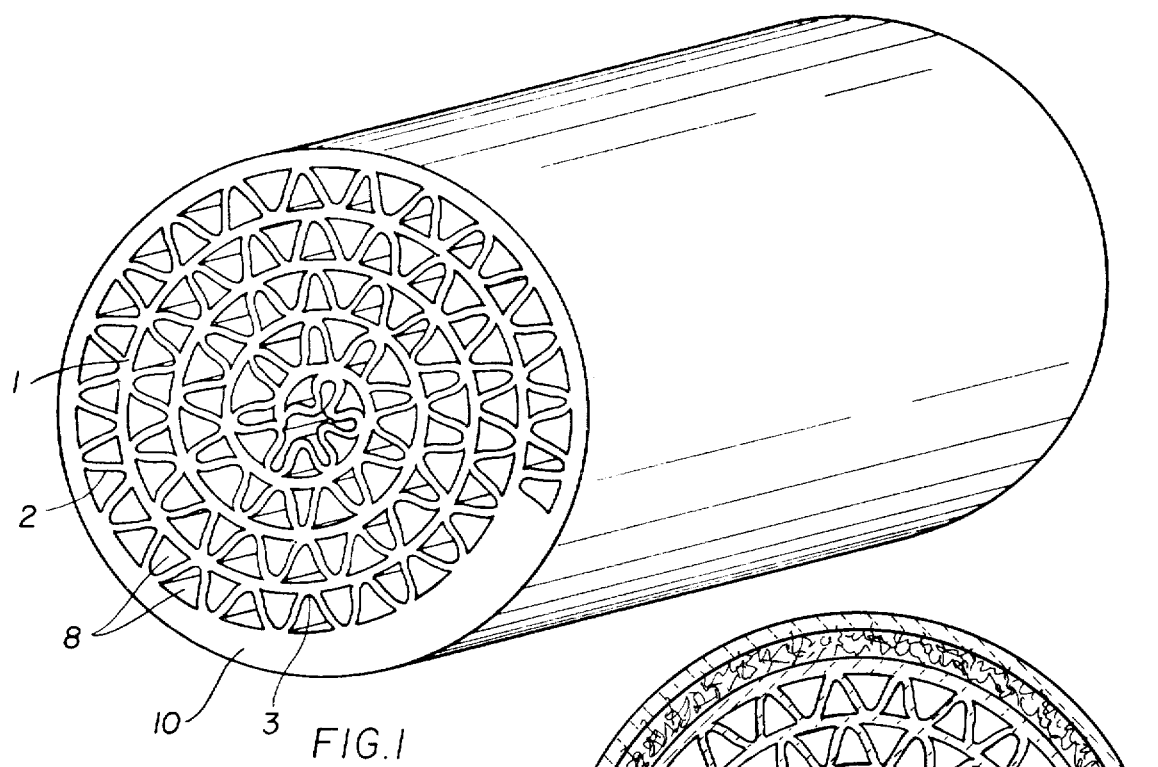
FIG. 1 is a perspective view of a first embodiment of the invention.

Referring initially to FIG. 1, there is seen a ceramic catalyst carrier having the approximate shape of a cylinder. Its core has radially alternating, spirally wound, smooth walls 1 and corrugated walls 2 mainly consisting of aluminum oxide and integrally bonded to each other along nodes 3 where the ribs of a corrugated wall 2 merge with a smooth wall 1. The walls 1,2 bound a multiplicity of axial conduits 8.

The average thickness of the nodes is less than 0.5 mm, and the thickness of the walls 1,2 is smaller. The thickness of the nodes 3, however, is much smaller than the combined thickness of the smooth and corrugated walls 1,2 joined in the nodes, and preferably not greater than the thickness of one wall by more than one third. The minimum wall thickness achieved so far is approximately 0.1 mm.

As described in more detail in the afore-mentioned earlier application, the smooth and corrugated walls are prepared by dipping a structure of cardboard or the like, prepared partly from cellulose fibers and partly from ceramic fibers, in an alumina slip, and firing the slip-coated and drained structure until the cellulose fibers are volatilized, and the aluminum oxide particles in the slip are sintered to each other.

The catalyst carrier shown in FIG. 1 has an outer shell 10 of cured aluminum phosphate cement directly applied to the outermost alumina wall of the honeycomb core structure. The drawing is not drawn to scale, and the thickness of the cured cement layer averages one millimeter.

The cement layer was applied by preparing a mixture of aluminum oxide powder with enough phosphoric acid to cause ultimate curing of the alumina and with water as needed to permit working the alumina and phosphoric acid into a stiff, but plastic paste which could then be applied to the previously fired core. The amount of phosphoric acid required varies greatly with the grain size distribution of the aluminum oxide powder and some experimentation is unavoidable for each new set of conditions to achieve best results. The amount of water in the original paste is irrelevant since the water is practically completely lost during curing. The paste originally also contained organic volatile ingredients as described above.

Figure 2:
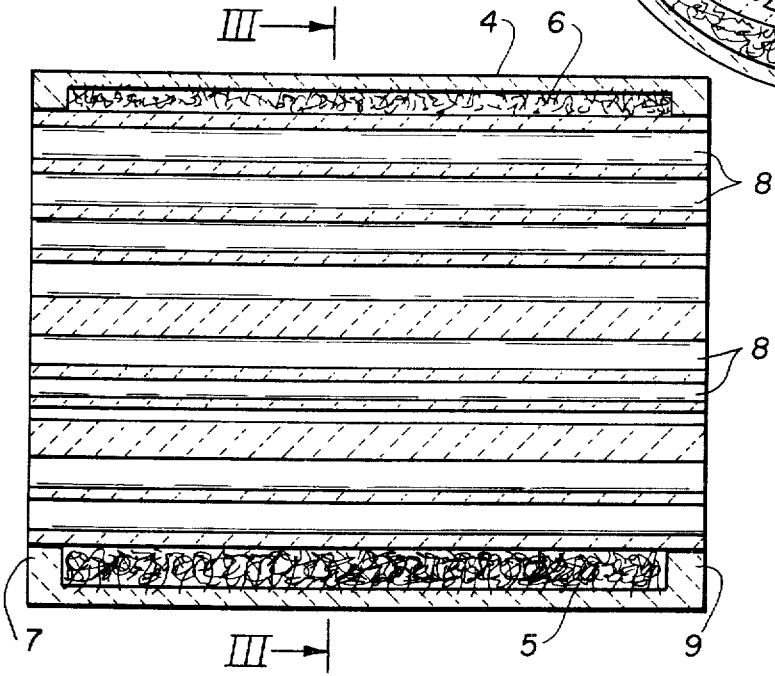
FIG. 2 shows a second embodiment in axial section.

The catalyst carrier illustrated in FIGS. 2 and 3 has a core identical with that described with reference to FIG. 1, and is constituted by spiral layers of smooth and corrugated aluminum oxide walls 1,2 which merge at nodes 3. The outermost face of the smooth wall 1 is separated from a generally cylindrical shell 4 of cured aluminum phosphate cement by an annular gap 5 over most of its axial length, the gap being occupied partly by ceramic fibers 6 many of which are integrally bonded to or embedded in the cement of the shell 4. The shell 4 has axially terminal, inner, radial flanges 7,9 which axially seal the gap 5 and are bonded to the outermost face of the core.

The following Examples are further illustrative of this invention.

EXAMPLE 1

Equal dry weights of groundwood and of kaolin fibers were suspended in an aqueous carrier by beating, and the stuff so formed was deposited on the travelling Fourdrinier screen of a paper machine at a rate to provide a porous web having a dry weight of 42 grams per square meter and an overall thickness of 0.2 mm. The kaolin fibers had an average length of 2 cm when received, but were broken to an average length of 4 mm in the beater. The dimensions of the cellulose fibers in the groundwood were not determined precisely, but their length in the web was about the same as that of the kaolin fibers.

The web discharged from the dry section of the paper machine was divided into two pieces which were passed through a conventional machine for making corrugated cardboard. One piece was passed between rotating rollers having meshing ribs and grooves, the height of each rib being 1.8 mm as measured from the pitch circle, and its width at the circle being 4 mm. A water glass solution was applied to the ribs, and the smooth piece of web was superposed under pressure on the adhesive coated ribs. A laminar structure analogous to corrugated cardboard except for the small thickness of each web was discharged from the corrugating machine and wound on a thin, rotating rod to a thickness of 4 inches. The substantially cylindrical roll was cut into axial sections five inches long, and each section was placed in a conforming wire basket.

A slip having a viscosity of 120 centipoise was prepared from 61 percent finely ground alumina containing 99.9 percent $Al_2O_3$, 1 percent polyvinyl alcohol as a suspending agent, and 38 percent water, all percentage figures herein being by weight unless stated otherwise specifically. Each basket was dipped briefly in the slip in a position in which the parallel conduits of the roll were upright, and the excess slip was permitted to drain off. The impregnated and coated rolls of fibrous material were then removed from the baskets and transferred to the work carrier of a tunnel oven in which they were dried at 30°C to evaporate most of the available water, and then fired for one hour at 1,600°C. The average wall thickness of the fired honeycomb structure in the catalyst carrier so produced was about 0.2 mm, its apparent density 0.4–0.5 g/cm³.

EXAMPLE 2

A cement mixture was prepared from the following ingredients:

| | | |
|---|---|---|
| α-Aluminum oxide | 28 – 48 mesh | 48% |
| | 48 – 90 mesh | 18% |
| | 90 – 200 mesh | 26% |
| | through 200 mesh | 8% |
| Disteroyl ethylenediamine (Hoechst Wax C) | | 3% |
| Dilute phosphoric acid (40%) | | 15% |

All the above percentage values are by weight. The alumina fractions were mixed first, and were then combined with the synthetic wax, and the mixture was gradually worked into the phosphoric acid solution to produce a homogeneous paste having a viscosity of 4000±300 cp.

The generally cylindrical outer wall of the catalyst carrier prepared in Example 1 was coated with the paste to a thickness of about 1 to 2 mm. It was then heated very slowly in an electrically heated furnace in which water was initially evaporated, and the paste stiffened. The chemical curing reaction started at about 200°C, and the temperature was further raised very slowly to an ultimate value of 400°C.

When removed from the furnace and cooled to ambient temperature, the structure had the general appearance seen in FIG. 1 and withstood localized radial pressures as high as 100 kp/mm$^2$ as compared to failure of the honeycomb core, as prepared in Example 1, at 3 to 7 kp/mm$^2$ under the same testing conditions. Axial strength, when applied uniformly to the radial end faces of the coated core was similarly improved, but the errors due to deviation of the end faces from precisely parallel alignment were too great to permit quantitative evaluation.

EXAMPLE 3

A core prepared by the method of Example 1 was tightly wrapped to a thickness of almost 2 mm over most of its length in a dry web prepared from equal weights of groundwood and kaolin fibers as described in Example 1. An annular portion of the outermost alumina face of the core, approximately 2 mm wide, was left uncoated on each axial end of the core. A layer of aluminum phosphate cement paste, prepared as described in Example 2, was applied to the outer face of the web in an approximately uniform thickness of 2 mm, and to the exposed terminal portions of the core in a thickness to make the outer surface of the coated core as closely cylindrical as was possible with the available hand tools.

The coated core was fired as described in Example 2. The cellulose in the wrapping material decomposed, and the thermal decomposition products are presumed to have been volatilized through the cement layer before the latter cured to a practically gastight shell. No significant amounts of carbon were found in the gap between the outer aluminum cement shell and the core structure. The latter was unchanged where it was spaced from the cement layer. At the axial ends of the core, the cured cement was bonded to the core. The gap was partly occupied by the kaolin fibers of which many had become embedded in the cured aluminum cement.

Figure 3:
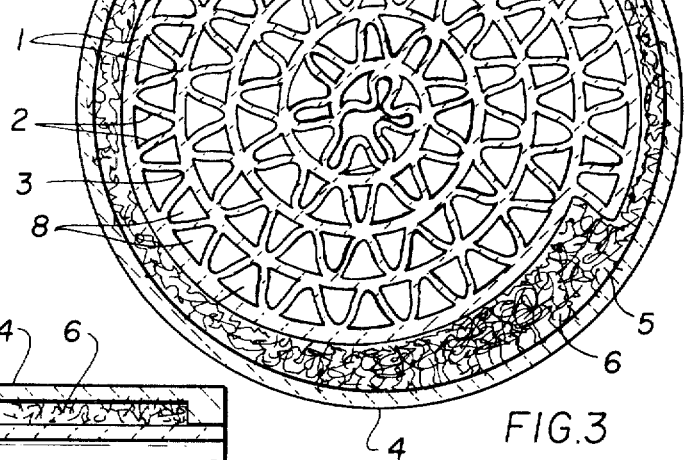
FIG. 3 is a radially sectional view of the device of FIG. 2 taken on the line III—III.

Quite surprisingly, the coated catalyst carrier of FIG. 3, which resulted from the procedure outlined above, was structurally as strong as that described in Example 2 when subjected to compression tests. The carrier prepared by the method of Example 3 was particularly insensitive to vibration and similar stresses caused by travel of an automobile earlier rough terrain. Its resistance to the thermal stresses inherent in catalyst operation was even better than that of the coated carrier shown in FIG. 1.

While the invention has been described with reference to cores and outer shells which are cylindrical or approximately circular in cross section, the core may be of other arcuate cross section in a plane perpendicular to its axis and to the direction of elongation of the conduits therein. An approximately elliptic cross section has been described in the eearlier application, and may be equally employed in the instant invention.

The aluminum phosphate shell, which extends about the axis of the shell in a closed loop and envelops the core, may engage the core in area contact in said closed loop, as has been shown in FIG. 1, so that the shell covers the outer axial face of the core in an arc of 360° in direct contact. As has also been shown, the shell may have a tubular wall portion spacedly enveloping the outer face of the core to bound therewith an annular gap.

However, outer shells of aluminum phosphate cement making area contact with the outer face of the core over a portion of the circumference of the latter while being spaced from the core face over another portion of the circumference are specifically contemplated and may be resorted to in a manner obvious from the preceding Examples.

It should be understood, therefore, that the foregoing disclosure related only to preferred embodiments of the invention, and that it is intended to cover all changes and modifications in the examples of the invention herein chosen for the purpose of the disclosure which do not constitute departures from the spirit and scope of the invention set forth in the appended claims.

What is claimed is:

1. A rigid catalyst carrier essentially consisting of a core and of an outer shell,
   a. said core consisting of ceramic walls integrally bonded in a honeycomb structure along nodes elongated in a common direction, said walls bounding continuous conduits elongated in said direction and essentially consisting of sintered aluminum oxide particles, the thickness of said walls and of said nodes being not greater than 0.5 millimeter, said core have an axis extending in said direction and being of arcuate cross section in a plane perpendicular to said axis;
   b. said shell extending about said axis in a closed loop and enveloping said core, said shell essentially consisting of aluminum phosphate and being of a thickness sufficient to enhance the radial compressive strength of said core by at least 100 percent.

2. A carrier as set forth in claim 1, wherein said shell engages said core in area contact in said closed loop.

3. A carrier as set forth in claim 1, wherein said core has an outer axial face extending about said axis in an arc of 360°, and said shell covers said outer face in direct contact over said arc.

4. A carrier as set forth in claim 1, wherein said core has an outer axial face of arcuate cross section, and said shell has a tubular wall portion spacedly enveloping said outer face, whereby said wall portion and said outer face bound therebetween an annular gap, and a multiplicity of elongated ceramic fibers in said gap.

5. A carrier as set forth in claim 4, wherein said fibers occupy not more than 50 percent of the volume of said gap.

6. A carrier as set forth in claim 5, wherein said fibers are partly embedded in said shell.

7. A carrier as set forth in claim 4, wherein said shell has axially terminal portions engaging said outer face and axially bounding said gap.

8. A carrier as set forth in claim 1, wherein said thickness of said shell is not greater than 2 millimeter.

9. A carrier as set forth in claim 1, wherein said thickness of said shell is approximately 1 millimeter.

* * * * *